United States Patent
Horning et al.

(10) Patent No.: US 7,959,399 B2
(45) Date of Patent: Jun. 14, 2011

(54) END EFFECTOR WITH COLLISION DETECTION SENSOR

(75) Inventors: Stephen Gregory Horning, Longmont, CO (US); John William Rigsby, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 753 days.

(21) Appl. No.: 11/753,336

(22) Filed: May 24, 2007

(65) Prior Publication Data

US 2008/0289705 A1 Nov. 27, 2008

(51) Int. Cl.
*B25J 15/06* (2006.01)

(52) U.S. Cl. ............ 414/737; 414/729; 901/40; 901/49

(58) Field of Classification Search ................... 414/729, 414/737; 192/56.31, 56.32; 74/490.06; 901/29, 901/49, 40
See application file for complete search history.

(56) References Cited

U.S. PATENT DOCUMENTS

| | | | |
|---|---|---|---|
| 4,636,135 A * | 1/1987 | Bancon | 414/730 |
| 4,657,470 A | 4/1987 | Clarke et al. | |
| 4,741,642 A | 5/1988 | Carlton | |
| 4,995,493 A * | 2/1991 | Cotsman et al. | 192/150 |
| 5,040,915 A | 8/1991 | Stuart et al. | |
| 5,086,901 A | 2/1992 | Petronis et al. | |
| 5,234,530 A | 8/1993 | Freeman, III | |
| 5,420,488 A | 5/1995 | Gutman | |
| 5,422,554 A | 6/1995 | Rohde | |
| 5,697,480 A | 12/1997 | Herbermann et al. | |
| 5,964,124 A * | 10/1999 | Nunes et al. | 74/490.01 |
| 6,129,476 A * | 10/2000 | Berman et al. | 403/229 |
| 6,795,750 B2 * | 9/2004 | Kullborg | 700/245 |
| 6,847,181 B2 | 1/2005 | Brooks et al. | |

* cited by examiner

*Primary Examiner* — Donald Underwood
(74) *Attorney, Agent, or Firm* — Christopher J. Volkmann; Westerman, Champlin & Kelly, P.A.

(57) ABSTRACT

In a robotic assembly, a body adapted for mounting on an arm is provided. A connection is adapted to couple the body and an end effector to allow deflection of the end effector with respect to the body between an open position and a closed position. A conduit allows fluid flow between the body and the end effector. A seal is adapted to engage the conduit to provide a fluid seal when the end effector is in the closed position and allow fluid flow when the end effector is in the open position. Further, end effector deflection can be detected based on the fluid flow and utilized to regulate movement of the robotic assembly.

20 Claims, 4 Drawing Sheets

END EFFECTOR WITH COLLISION DETECTION SENSOR

BACKGROUND

Many manufacturing applications utilize robotic assemblies for component production, fabrication, and/or assembly. Many of these applications utilize end effectors which are, generally, a device or tool connected to an end of a robotic arm. The end effector can be utilized to perform applications such as, but not limited to, lifting and placing components, palletizing items, inspecting and testing products, operating tools (i.e., pliers, wrenches, screw drivers, soldering irons), and controlling external applications.

End effector crashes occur when end effectors collide with objects in the operating environment. End effector crashes can be caused by misalignment and/or over-travel of the robotic assembly. These crashes can lead to damage to the end effector, robotic assembly and/or to products being assembled. This damage can cause substantial downtime and/or costly repairs. While current robotic assemblies include end effectors that allow deflection, sensing the deflection can add significant costs in assembling and operating these robotic assemblies.

SUMMARY

In a robotic assembly, a body adapted for mounting on an arm is provided. A connection is adapted to couple the body and an end effector to allow deflection of the end effector with respect to the body between an open position and a closed position. A conduit allows fluid flow between the body and the end effector. A seal is adapted to engage the conduit to provide a fluid seal when the end effector is in the closed position and allow fluid flow when the end effector is in the open position.

These and various other features and advantages will be apparent from a reading of the following Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
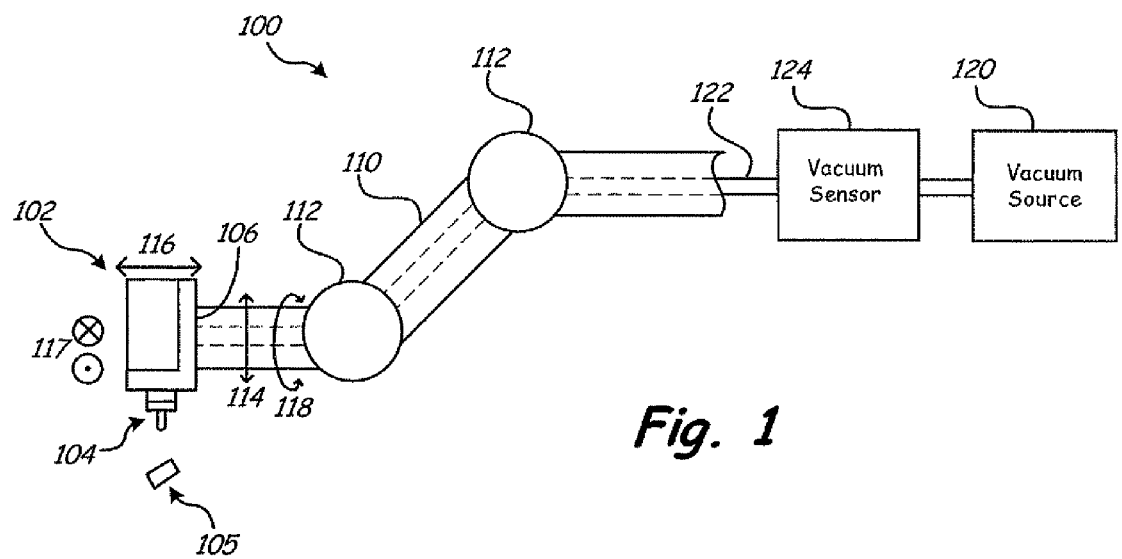
FIG. 1 is a schematic diagram illustrating an exemplary robotic assembly.

FIG. 1 is a schematic diagram illustrating an exemplary robotic assembly. Robotic assembly 100 includes a robotic arm 110 having an end assembly 102 mounted thereto by a connection 106. As illustrated in FIG. 1, connection 106 is adapted to provide a rotatable engagement between arm 110 and assembly 102. For example, connection 106 can be a multi-axis configuration adapted to allow end assembly 102 to rotate in multiple planes with respect to arm 110. However, connection 106 can be adapted to provide a fixed connection with arm 110.

Robotic arm 110 includes one or more joints 112 adapted to enable movement of robotic arm 110 in multiple directions. In one example, joints 112 enable rotation in all directions with respect to a coordinate system. As illustrated, joints 112 enable movement of robotic arm 110 in a vertical direction 114 and in horizontal directions 116 and 117. Further, joints 112 can also enable arm 110 to rotate (i.e., twist) in a direction 118.

Assembly 102 includes an end effector 104 adapted to perform applications such as, lifting and placing components, operating tools (i.e., pliers, wrenches, screw drivers, soldering irons), crimping wire, and controlling external applications. For example, end effector 104 can be configured to lift and place electronic components such as component 105. In this case, end effector 104 is brought into contact with component 105 with the robotic arm in a first position. End effector 104 is coupled to a vacuum source 120 such that end effector 104 picks up component 105 through use of negative pressure created by the vacuum source 120. Robotic arm 110 can then be moved to a second position to place the component as desired, for example on a printed circuit board. In another example, end effector 104 is configured to move larger components such as, but not limited to, automobile components. Further, end effector 104 can be adapted to weld, paint, iron, inspect and test products, or palletize items. It is noted that these are simply examples of some applications of robotic assembly 100. Any suitable application of end effector 104 is within the scope of concepts presented herein.

Robotic assembly 100 includes a vacuum source 120 and a vacuum path 122. Vacuum path 122 is, as illustrated, a conduit running from vacuum source 120 through robotic assembly 100 to end assembly 102. Joints 112 are adapted to accommodate fluid path 122 therein, while enabling movement including rotation of arm 110 and end assembly 102 with respect to arm 110. Alternatively, conduit 122 can be external to robotic arm 110.

Source 120 provides a vacuum through fluid path 122 to end assembly 102. Fluid within fluid path 122 flows in a direction from end assembly 102 to vacuum source 120. It is noted that the term "vacuum" is used herein to indicate at least a partial vacuum wherein vacuum source 120 provides a pressure less than an external pressure of assembly 100.

In one embodiment, source 120 provides a vacuum to end effector 104 to perform applications within a working environment. For example, end effector 104 can be utilized to lift and place components using the vacuum. Although illustrated herein where source 120 is a vacuum, positive pressure can be plumbed through assembly 102 to a surface of end effector 104.

In one embodiment, vacuum pressure supplied by source 120 is utilized to detect deflection of end effector 104. A fluid path (i.e., a conduit) is supplied through assembly 102 to end effector 104. Further, end effector 104 is attached to a body of end assembly 102 using a connection which enables movement of end effector 104 with respect to the body between a closed position and an open position. Deflection of end effector 104 away from the body of end assembly 102 (i.e., from the closed position to the open position) breaks a seal formed between end effector 104 and the body, which causes a change in pressure in the conduit.

A sensor 124 is adapted to monitor changes in fluid pressure within conduit 122 and provide a signal indicative of pressure change. This signal is indicative of a deflection of end effector 104 that caused the pressure change and can be utilized to control movement of the robotic assembly 100. For instance, the robotic assembly 100 can be configured such that movement of the robotic arm 110 is immediately stopped, or reversed, if deflection of the end effector 104 is detected. Stopping robotic assembly 100 upon detection of end effector deflection can operate to reduce, or eliminate, damage to the end effector, robotic assembly, and/or components of products being assembled. Sensor 124 can be mounted on, or adjacent to, assembly 102 or provided remote from assembly 102, as desired. It is noted that source 120 can also be adapted to supply positive pressure to end effector 102 to be utilized to detect deflection of end effector 104.

A single vacuum source 120 for supplying negative pressure to end effector 104 is provided. The single vacuum source can be utilized to provide negative pressure for working applications (i.e., assembly, tooling) as well as to detect deflection of the end effector. Alternatively, multiple vacuum sources can be utilized to supply a vacuum to end effector 104. In one example, a first vacuum source provides negative pressure through a first conduit to a surface of end effector 104 for lifting and placing components while a second vacuum source provides negative pressure through a second conduit to be utilized to detect deflection. In such a multi-source configuration, multiple sensors can be utilized for each source. Further, pressure levels in the second conduit can be sensed independent of pressure levels in the first conduit.

In other examples, pre-existing fluid paths plumbed through a robotic arm for working applications (i.e., assembly, tooling) can be modified to supply negative pressure to the end effector to detect deflection. In this manner, it is advantageous to utilize pre-existing fluid paths in the robotic arm such that additional conduits and sensors are not required within arm 110 to provide deflection detection. It is also noted that electrical conduits and connections can be utilized in embodiments described herein. In such examples, electrical conduits (not shown) can be provided to end assembly 102 following paths similar to fluid path 122. Alternatively, electrical conduits can be provided in paths external to robotic arm 110. The electrical conduits can be adapted to, for example, provide electrical power or ground connections.

It is important to note that robotic assembly 100 is simply one illustrative example in which concepts described herein may be utilized. Any other suitable configurations of robotic assembly 100 can be used.

FIGS. 2-5 illustrate an end assembly 200 similar to end assembly 102 that is adapted to be coupled to a robotic arm such as arm 110. Assembly 200 can be coupled to robotic assemblies such as those described with regard to FIG. 1.

Figure 2:
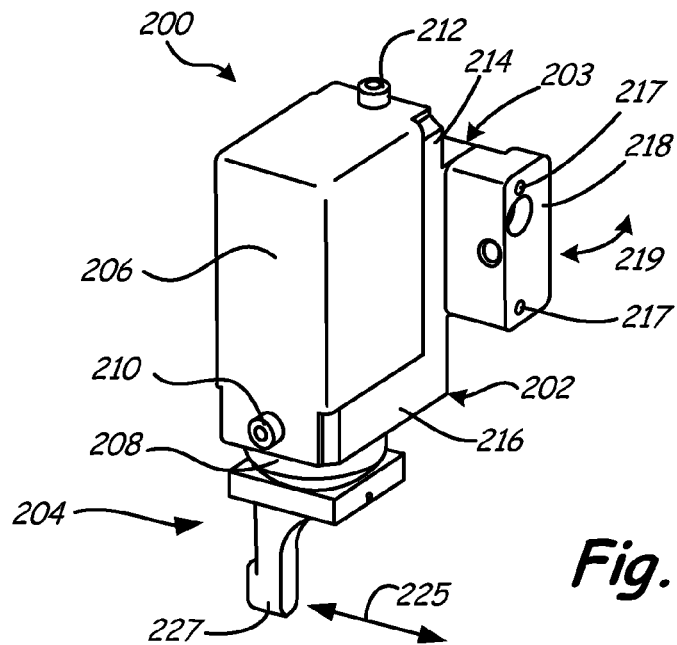
FIG. 2 is a top perspective view of an end assembly for mounting to a robotic arm.

FIG. 2 is a top perspective view of end assembly 200. Assembly 200 includes a body 202, an end effector 204, and a cover 206 attached to body 202 by fasteners 210 and 212. Body 202 is generally "L-shaped" and includes a vertical panel 214 adapted to mount to a robotic arm and a horizontal panel 216 proximate end effector 204. An interface 208 is positioned between body 202 and end effector 204 and is secured to body 202 by a plurality of fasteners 226 (shown in FIGS. 3 and 4). The fasteners 226 are inserted into apertures 230 (shown in FIG. 5) formed in body 202 and engage corresponding apertures 232 (shown in FIG. 5) formed in interface 208. Alternatively, end effector 204 can be mounted directly to body 202.

Body 202 is configured to receive fluid flow directly from the robotic arm. In one example, a surface 203 of body 202 is adapted to receive a fluid path, such as path 122, from the robotic arm. Surface 203 can have apertures formed therein that are configured to receive the fluid path from the robotic arm.

Assembly 200 can also include a gage 218 for setting hard stops on the robotic assembly. In one example, gage 218 is utilized to adjust a rotational range of assembly 200 with respect to a robotic arm. Gage 218 includes attachment apertures 217 configured to receive fasteners (e.g., screws, bolts, nails, rivets, etc.) for attachment to body 202.

Figure 3:
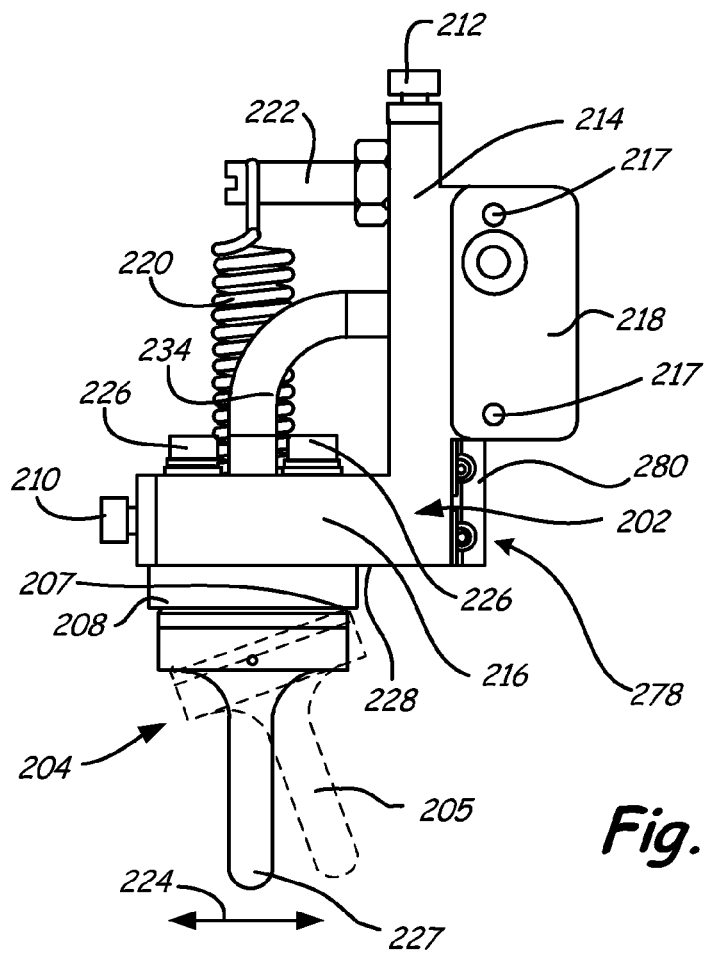
FIG. 3 is a side view of the assembly of FIG. 2 with the cover removed.

FIG. 3 is a side view of assembly 200 with the cover removed. A biasing element (herein a spring) 220 connects the end effector 204 to the body 202 and allows deflection of the end effector 204 with respect to the body 202. The spring 220 is attached to body 202 by an attachment mechanism 222. As illustrated, attachment mechanism 222 can be a post connected to body 202 utilizing an attachment aperture 221 (shown in FIG. 5). Spring 220 is further attached to a spring mount 223 (shown in FIG. 5) on end effector 204. End effector 204 is illustrated in FIG. 3 in a closed position, wherein a surface of end effector 204 is substantially flush with interface 208. Spring 220 is adapted to allow deflection of end effector 204 between the closed position and an open position 205 (illustrated in FIG. 3 as dashed lines), wherein end effector 204 is rotated with respect to interface 208. In particular, spring 220 is adapted to allow movement of tip 227 of end effector 204 in multiple directions (i.e., 224 and 225). For example, during end effector crash, spring 220 enables end effector 204 to deflect with respect to body 202.

Deflection of end effector 204 discourages damage to the end effector and robotic assembly. To illustrate, lateral forces (for example forces in directions 224 or 225) applied to end effector 204 cause deflection of the end effector with respect to body 202. Deflection of end effector 204 causes tension to be applied to biasing mechanism 220 (herein a spring). Spring 220 absorbs a portion of the applied force which causes spring 220 to be elongated to some extent. Unlike rigid connections, springs and other similar biasing members allow greater deflection without breaking. For example, such biasing members apply restoring forces which return end effector 204 to the closed position after deflection forces have been removed.

Multiple biasing element configurations can be utilized within assembly 200. For example, springs having different spring constants can be used depending upon the desired spring stiffness. Thus, if a highly flexible connection is desired between body 202 and end effector 204, a spring having a low spring constant can be used. On the other hand, if a more rigid connection is desired, a spring having a high spring constant can be used.

Figure 4:
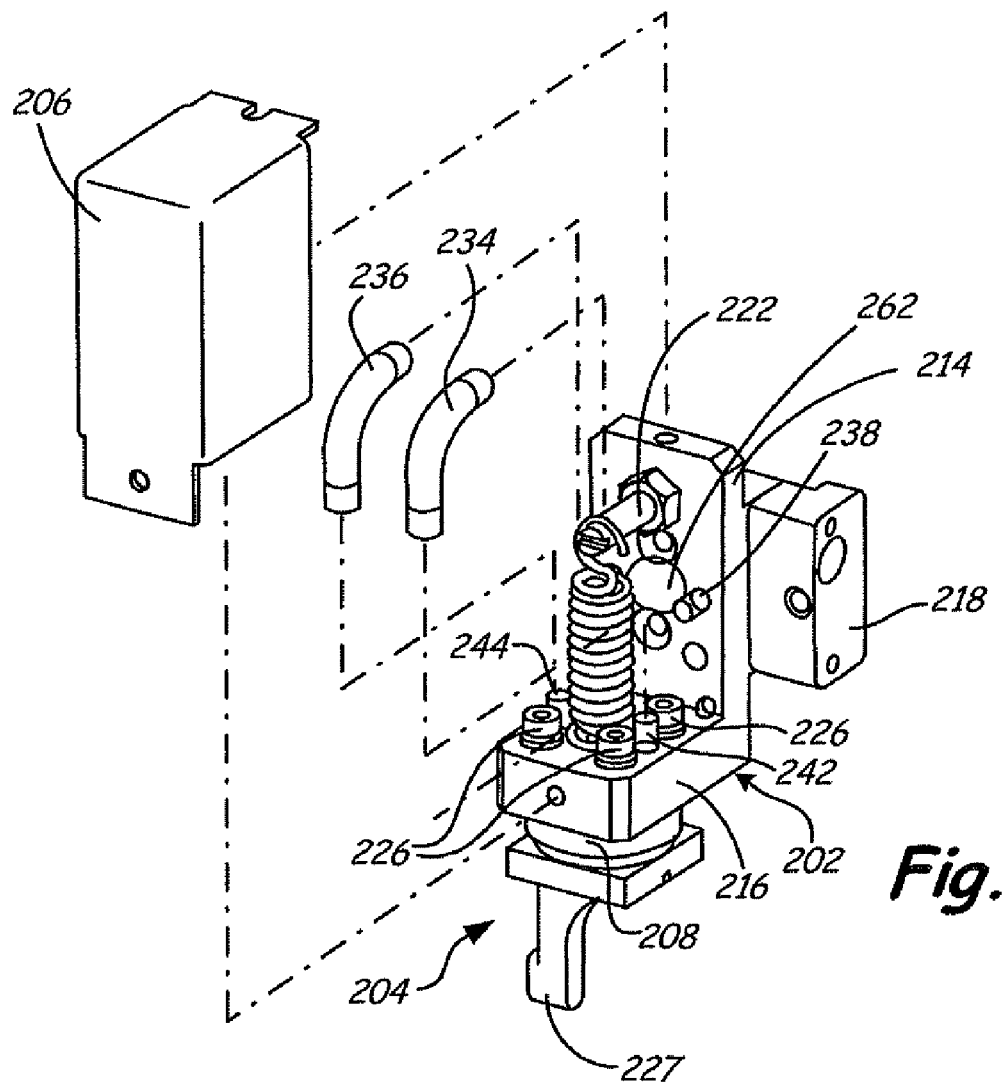
FIG. 4 is a partially exploded view of the assembly of FIG. 2.

FIG. 4 is a partially exploded top perspective view of assembly 200. In order to connect a fluid source (i.e, vacuum source 120) to end effector 204, end assembly 200 includes tubes 234 and 236 adapted to provide fluid paths through body 202. Further, body 202 includes a plurality of attachment points 238, 240 (not shown in FIG. 4), 242, and 244 (herein illustrated as protrusions) adapted to receive, and enable fluid flow through, tubes 234 and 236. Attachment points 238 and 240 have apertures formed therein providing fluid paths into a cavity 270 formed in panel 214 of body 202. Cavity 270 is adapted to receive fluid pressure supplied from the fluid source.

In another embodiment, body 202 can include multiple cavities, each cavity being configured to receive fluid flow from a separate conduit in assembly 200. For instance, one cavity can be connected to a first conduit formed by tube 234 and a second cavity can be connected to a second conduit formed by tube 236. Each of the multiple cavities can be connected to separate conduits in the robotic arm. In one embodiment, fluid flow through each of the conduits in the robotic arm are independently monitored by a sensor, such as sensor 124.

Attachment points 242 and 244 include apertures formed therein providing fluid paths through panel 216 to a bottom surface 228 of body 202. As illustrated, attachment points 238, 240, 242, and 244 are protrusions adapted to engage an interior surface of tubes 234 or 236. Alternatively, attachment points 238, 240, 242, and 244 can be formed without protrusions. In one embodiment, attachment points 238, 240, 242, and 244 are adapted to receive a portion of tubes 234 or 236 therein. For example, attachment points 238, 240, 242, and 244 can comprise apertures formed in panels 214 and 216 of body 202 that are adapted to engage an exterior surface of tubes 234 or 236.

Figure 5:
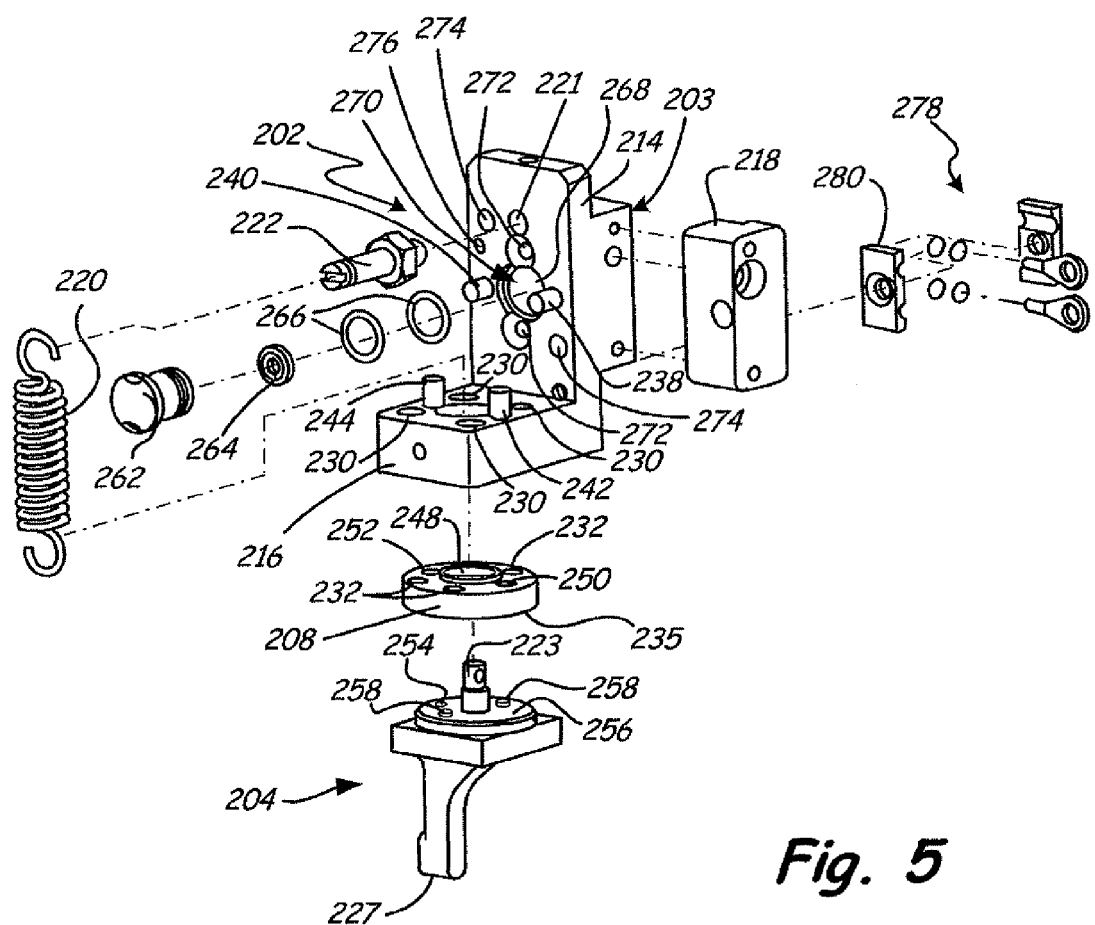
FIG. 5 is an exploded top perspective view of the assembly of FIG. 2.

FIG. 5 is an exploded perspective view of assembly 200. Assembly 200 is illustrated with a number of components removed. For example, tubes 234 and 236, and fasteners 226 are not shown in FIG. 5. Interface 208 is positioned between body 202 and end effector 204. Interface 208 includes a plurality of apertures 232 that are aligned with apertures 230, and adapted to receive fasteners 226 (shown in FIG. 4). In one example, apertures 232 are threaded and configured to engage threaded fasteners 226, Alternatively, fasteners 226 and apertures 232 can be smooth (i.e., non-threaded). Interface 208 also includes an aperture 248 configured to accommodate spring mount 223 of end effector 204. Further, interface 208 includes apertures 250 and 252 aligned with apertures 242 and 244, respectively, in body 202.

A first conduit fluid path is formed through assembly 200 to end effector 204. The first conduit comprises attachment point 238, tube 234, attachment point 242, and aperture 250. A second conduit fluid path is also formed through assembly 200 to end effector 204. The second conduit comprises attachment point 240, tube 236, attachment point 244, and aperture 252. However, it is noted that changes can be made to the conduit configurations. For example, tubes 234 and 236 can be adapted to extend through panel 216 of body 202. Further, tubes 234 and 236 can be adapted to extend into and/or through apertures 250 and 252 in interface 208.

End effector 204 includes an aperture 254 aligned with aperture 252 in interface 208. Aperture 254 extends through end effector 204 to tip 227 and provides a fluid path therein. In one example, a conduit is provided though assembly 200 to tip 227 for assembly applications such as lifting and placing components.

In one embodiment, tube 236 can be configured to extend into aperture 254 on end effector 204. Thus, tube 236 can be adapted to remain within aperture 254 when deflection of end effector 204 occurs. In this manner, vacuum (or positive) pressure can be maintained at tip 227 during end effector deflection.

End effector 204 includes a mating surface 256 adapted to engage a conduit fluid path in assembly 200. As illustrated in FIG. 5, mating surface 256 is configured to engage a bottom surface 235 of interface 208 proximate aperture 250, thus providing at least a partial conduit seal that discourages fluid flow. When end effector 204 is deflected to an open position, the seal provided by mating surface 256 is removed, thereby allowing fluid flow through aperture 250.

A sensor such as vacuum sensor 124 can be utilized to produce signals based on fluid pressure within assembly 200. In one example, a vacuum source supplies vacuum pressure through a conduit in assembly 200 to mating surface 256 of end effector 204. When end effector 204 is in a closed position, fluid flow through the conduit is discouraged and vacuum pressure (i.e., pressure less than the surrounding ambient pressure) is created within the conduit. When end effector 204 is deflected to an open position, the seal is broken (i.e., removed from the conduit) and the conduit is exposed to fluid in the surrounding environment having higher pressure levels. The fluid having higher pressure is biased into the conduit resulting in an increase in fluid pressure within the conduit. This increase in pressure can be sensed by the fluid pressure sensor. Again, it is noted that positive pressure can also be utilized. Further, liquid can also be supplied by the fluid source.

The sealing engagement formed by mating surface 256 can be broken by end effector deflection in any direction. For example, when end effector 204 collides with an object to cause movement to an open position (such as position 205), mating surface 256 does not form a seal with surface 235. Thus, a force placed on end effector 204 in any lateral direction (for instance, directions 224 and 225 illustrated in FIG. 3) can cause deflection of end effector 204 to an open position thereby breaking the conduit seal formed by mating surface 256. Pressure sensor 124 can then detect this change in pressure to provide a signal indicative of the deflection.

Current methods of detecting end effector deflection utilizing optical or magnetic sensors require separate sensors for different angles of movement/deflection. Further, these current methods utilizing optical and magnetic sensors can also require substantial costs in alignment of sensing components. For example, the use of optical or magnetic sensors often requires that substantial calibration procedures be performed. For instance, the use of optical sensors requires alignment of a light source (an emitter) and a receiver as well as adjustment of sensitivity settings (i.e., the light intensity required to detect the target). Further, the use of optical and magnetic sensors requires the inclusion of electrical wiring through end assembly 102 as well as arm 110. If multiple optical or magnetic sensors are used for different angles of deflection, these costs can be further increased.

In contrast, sensing fluid pressure change with pressure sensor 124 can be provided with limited modification of a robotic assembly. For example, deflection of end effector 204 in any direction will result in a pressure change that can be detected by sensor 124. As such, multiple sensors adapted to sense different deflection directions or angles are not required. Additionally, substantial calibration or alignment of sensing components can be avoided. Further yet, existing fluid paths in the robotic assembly can be utilized for sensing deflection and thus additional fluid paths or electrical wiring are not required.

After deflection of end effector 204, alignment protrusions 258 operate to realign end effector 204 with body 202. Alignment protrusions 258 are configured to engage a corresponding set of apertures (not shown) formed in a bottom surface 235 of interface 208. In one embodiment, alignment protrusions 258 comprise a plurality of dowel pins. Protrusions 258 are configured such that, when engaged to interface 208, aperture 252 in interface 208 is aligned with aperture 254 in end effector 204. Further, protrusions 258 align end effector 204 with respect to interface 208 such that tip 227 of end effector 204 is properly positioned with respect to the body 202. Misalignment of end effector tip 227 with respect to body 202 can result, for instance, in an undesired offset when components are placed.

Further, when alignment protrusions 258 engage interface 208, lateral movement of end effector 204 with respect to interface 208 is discouraged. In this manner, lateral forces placed on end effector 204 in any direction can cause end effector 204 to pivot, or rotate, with respect to the body 202 (for example, about a pivot point 207 illustrated in FIG. 3) thus breaking the seal formed between the end effector 204 and the conduit that provides fluid flow between the body 202 and the end effector 204.

Further, alignment protrusions 258 can be of varying length depending on the desired application. For example, in some applications a relatively flexible connection between interface 208 and end effector 204 is desired to enable deflection of end effector 204 in response to a small amount of force placed on end effector 204. Further, protrusions 258 can be adapted to be short in length to allow for easier realignment after end effector 204 has been deflected. Alternatively, in applications where a more rigid connection between interface 208 and end effector 204 is desired, the protrusions or dowel pins 258 can be relatively long to discourage disengagement from interface 208. In other embodiments, alignments 258 can comprise apertures formed in a surface of end effector 204, while interface 208 comprises corresponding protrusions adapted to engage the protrusions on end effector 204.

An aperture 268 in cavity 270 is sealed by a plug mechanism 262, washer 264, and O-rings 266. Further, apertures 272 are formed in body 202 and adapted to receive attachment mechanisms (not shown). The attachment mechanisms are inserted into apertures 272, after plug 262 has been engaged to apertures 268, and provide biasing force that encourages a sealing engagement between plug 262 and aperture 268.

Body 202 includes mounting apertures 274 formed through panel 214 and adapted to provided means of attaching body 202 to an arm. In one example, attachment mechanisms (e.g., screws, bolts, rivets, or any other suitable fasteners) are inserted into apertures 274 and engage a surface of a robotic arm such as arm 110 illustrated in FIG. 1. Body 202 can also include an aperture 276 adapted to receive a dowel pin that protrudes beyond a back surface 203. The dowel pin is utilized for angular orientation of body 202.

Assembly 200 can also include ground components 278 attached to body 202. Ground components 278 provide electrostatic discharge (ESD) and ground monitor connections to body 202. A connection mechanism 280 is utilized to attach ground components 278 to a surface of body 202. In one example, ground wires (not shown) are attached to components 278 utilizing a strain-relieved configuration that discourages sharp bending and stress on the wires and components 278.

Although the present invention has been described with reference to preferred embodiments, workers skilled in the art will recognize that changes may be made in form and detail without departing from the spirit and scope of the invention.

What is claimed is:

1. A device comprising:
   a vacuum source;
   a vacuum sensor;
   a body adapted for mounting on an arm;
   an end effector;
   a connection coupling the body and the end effector, the connection being configured to allow rotation of the end effector about a pivot point with respect to the body from a closed position to an open position;
   a fluid flow path provided through the body, wherein the vacuum source is configured to generate a negative fluid pressure in the fluid flow path relative to an ambient pressure; and
   a sealing mechanism comprising a portion of the end effector and configured to provide at least a partial fluid seal that discourages fluid flow along the fluid flow path when the end effector is in the closed position and allows fluid flow along the fluid flow path when the end effector is in the open position, wherein the vacuum sensor is configured to generate an output indicative of a change in fluid pressure in the fluid flow path.

2. The device of claim 1, wherein the portion of the end effector includes a surface that faces the body and is deflected away from the conduit when the end effector rotates with respect to the body about the pivot point.

3. The device of claim 2 wherein the connection coupling the body and the end effector comprises an interface component positioned between the end effector and the body, wherein the interface component includes at least one aperture forming a fluid flow path fluidically coupled to the fluid flow path through the body.

4. The device of claim 3 wherein the end effector comprises at least one alignment protrusion adapted to engage an aperture in the interface component when the end effector is in the closed position.

5. The device of claim 4 wherein the interface component is fixedly attached to a surface of the body.

6. The device of claim 1 wherein the connection comprises a spring coupling the body and the end effector, the spring having a first end attached to a portion of the body and a second end attached to a portion of the end effector, and wherein the spring exerts a force on the portion of the body toward the end effector.

7. The device of claim 1 and further comprising a second fluid flow path fluidically coupled to a tip of the end effector, wherein a negative fluid pressure is provided in the second fluid flow path and is utilized to pick a component at the tip.

8. A method comprising:
   connecting an end effector to a body using a connection being adapted to allow rotation of the end effector with respect to the body between a first position and a second position;
   providing a fluid path through the body, wherein the fluid path is fluidically coupled to a source configured to generate a negative fluid pressure in the fluid path relative to an ambient pressure;
   providing a fluid seal inhibiting fluid flow through the fluid path when the end effector is in the first position to reduce a fluid pressure in the fluid path below the ambient pressure and allowing fluid flow through the fluid path when the end effector is in the second position; and
   generating a signal indicative of a change in pressure in the fluid path, the signal being indicative of rotation of the end effector from the first position to the second position.

9. The method of claim 8, wherein generating the signal comprises measuring a fluid pressure using a vacuum sensor.

10. The method of claim 8 further comprising controlling movement of the robotic arm based on the signal.

11. The method of claim 8, and further comprising:
   providing a second fluid path from a tip of the end effector; and
   generating a negative fluid pressure in the second fluid path relative to the ambient pressure.

12. A robotic assembly comprising:
   a robotic arm;
   an end assembly coupled to the robotic arm, the end assembly including a body and an end effector;
   a conduit defining at least a portion of a fluid path for fluid flow from a surface of the end effector; and
   a connection component coupling the end effector and the body of the end assembly, the connection component enabling rotation of the end effector about a pivot point between an open position and a closed position, wherein the surface of the end effector is configured to form at least a partial fluid seal that discourages fluid flow through the fluid path when the end effector is in the closed position, and wherein the connection component is attached to the body at a first attachment point and is attached to the end effector at a second attachment point, the component component exerting a biasing force on the second attachment point toward the first attachment point to bias the end effector to the closed position.

13. The assembly of claim 12 wherein a source is fluidically coupled to the fluid path and is configured to generate a negative fluid pressure in the fluid path relative to an ambient pressure.

14. The assembly of claim 13 and further comprising a pressure sensor responsive to fluid in the fluid path, the sensor being adapted to generate a signal indicative of a deflection of the end effector.

15. The assembly of claim 14 and further comprising a controller adapted to regulate movement of the robotic arm based on the signal.

16. The assembly of claim 12, and further comprising a second fluid path from a tip of the end effector to a source configured to generate a negative fluid pressure in the second fluid path relative to an ambient pressure.

17. The assembly of 12, wherein the connection component comprises a tension spring connecting the body and the end effector.

18. The method of claim 11, and further comprising performing a component picking operation using the tip of end effector.

19. The device of claim 3, wherein the interface component comprises an aperture configured to accommodate a spring.

20. The device of claim 19, wherein the spring has a first end attached to a portion of the body and a second end attached to a portion of the end effector, the spring being configured to exert a force on the portion of the body toward the end effector.

* * * * *